(12) United States Patent
Tanaka et al.

(10) Patent No.: US 10,017,612 B2
(45) Date of Patent: Jul. 10, 2018

(54) RUBBER COMPOSITION

(71) Applicant: TOYO TIRE & RUBBER CO., LTD., Osaka-shi, Osaka (JP)

(72) Inventors: Makoto Tanaka, Osaka (JP); Kenji Nomura, Osaka (JP); Norio Minouchi, Osaka (JP)

(73) Assignee: TOYO TIRE & RUBBER CO., LTD., Osaka-shi (JP)

( * ) Notice: Subject to any disclaimer, the term of this patent is extended or adjusted under 35 U.S.C. 154(b) by 75 days.

(21) Appl. No.: 15/035,346

(22) PCT Filed: May 12, 2014

(86) PCT No.: PCT/JP2014/062623
§ 371 (c)(1),
(2) Date: May 9, 2016

(87) PCT Pub. No.: WO2015/068416
PCT Pub. Date: May 14, 2015

(65) Prior Publication Data
US 2016/0289398 A1 Oct. 6, 2016

(30) Foreign Application Priority Data
Nov. 11, 2013 (JP) .................. 2013-233228

(51) Int. Cl.
C08J 3/20 (2006.01)
C08J 3/22 (2006.01)
C08K 3/04 (2006.01)
B60C 1/00 (2006.01)
C08J 3/21 (2006.01)

(52) U.S. Cl.
CPC ............ *C08J 3/226* (2013.01); *B60C 1/0016* (2013.01); *B60C 1/0025* (2013.01); *C08J 3/20* (2013.01); *C08J 3/203* (2013.01); *C08J 3/21* (2013.01); *C08K 3/04* (2013.01); *C08J 2307/00* (2013.01); *C08J 2307/02* (2013.01); *C08J 2321/02* (2013.01); *C08J 2325/10* (2013.01); *C08J 2347/00* (2013.01); *C08J 2407/02* (2013.01); *C08J 2421/02* (2013.01); *C08K 2201/006* (2013.01)

(58) Field of Classification Search
CPC ..... C08J 3/226; C08J 3/20; C08J 3/203; C08J 3/21; C08K 3/04; B60C 1/0016; B60C 1/0025
USPC ........................................................ 523/351
See application file for complete search history.

(56) References Cited

U.S. PATENT DOCUMENTS

| 5,780,537 A | 7/1998 | Smith et al. |
| 6,077,899 A | 6/2000 | Yatsuyanagi et al. |
| 7,640,957 B2 * | 1/2010 | Sandstrom ............ B60C 1/0016 152/209.1 |
| 8,053,496 B1 | 11/2011 | Minouchi et al. |
| 8,110,620 B1 | 2/2012 | Minouchi |
| 8,258,207 B2 * | 9/2012 | Gaudet ..................... B60C 1/00 152/151 |
| 9,139,705 B2 | 9/2015 | Kimura |
| 9,290,634 B2 | 3/2016 | Miyasaka |
| 9,353,239 B2 | 5/2016 | Miyasaka et al. |
| 9,527,968 B2 | 12/2016 | Nomura et al. |
| 2003/0144406 A1 | 7/2003 | Gorl et al. |
| 2015/0011677 A1 | 1/2015 | Kimura |
| 2015/0240060 A1 | 8/2015 | Wada |
| 2016/0289398 A1 | 10/2016 | Tanaka et al. |
| 2017/0137582 A1 | 5/2017 | Nomura et al. |

FOREIGN PATENT DOCUMENTS

| JP | 59-27932 A | 2/1984 |
| JP | 59-49247 A | 3/1984 |
| JP | 10-95856 A | 4/1998 |
| JP | 2002-256109 A | 9/2002 |
| JP | 2003-26816 A | 1/2003 |
| JP | 2007-197622 A | 8/2007 |
| JP | 2009-96981 A | 5/2009 |
| JP | 2012-111888 A | 6/2012 |
| JP | 2012-158666 A | 8/2012 |
| JP | 2012-197375 A | 10/2012 |

(Continued)

OTHER PUBLICATIONS

International Search Report dated Jul. 22, 2014, issued in counterpart International Application No. PCT/JP2014/062623 (2 pages).
International Search Report dated Jun. 17, 2014, issued in Application No. PCT/JP2014/056944, counterpart to U.S. Appl. No. 14/912,255.
Notification of Transmittal of Translation of the International Preliminary Report on Patentability (Form PCT/IB/338) of International Patent Application No. PCT/JP2014/056944, dated Mar. 28, 2016 with Forms PCT/IB373 and PCT/ISA/237, counterpart to U.S. Appl. No. 14/912,255.
Carbon Black Handbook, Third Ediction, Carbon Black Association, Apr. 15, 1995, p. 266.
Office Action dated Apr. 26, 2017, issued in Japanese Application No. 2013-187396, with English translation, counterpart to U.S. Appl. No. 14/912,255.

(Continued)

*Primary Examiner* — Edward J Cain
(74) *Attorney, Agent, or Firm* — Westerman, Hattori, Daniels & Adrian, LLP

(57) ABSTRACT

A rubber composition obtained by dry-mixing a rubber wet masterbatch A containing a carbon black A having a nitrogen adsorption specific: surface area ($N_2SA$) of NA ($m^2/g$) with a rubber wet masterbatch B containing a carbon black B having a nitrogen adsorption specific surface area ($N_2SA$) of NB ($m^2/g$),
wherein the content ratio of the rubber wet masterbatch A to the rubber wet masterbatch B is from 5/95 to 40/60, and when the content proportion of the carbon black A in the rubber wet masterbatch A is represented by LA, and that of the carbon black B in the rubber wet masterbatch B is represented by LB, the specific expressions are satisfied.

6 Claims, No Drawings

(56) References Cited

FOREIGN PATENT DOCUMENTS

JP       2013-199543 A     10/2013
WO     2011/145586 A1    11/2011

OTHER PUBLICATIONS

Non-Final Office Action dated Jun. 15, 2017, issued in U.S. Appl. No. 14/912,255.
Notification of Transmittal of Translation of the International Preliminary Report on Patentability (Form PCT/IB1338) dated May 26, 2016, issued in counterpart International Application No. PCT/JP2014/062623 with Forms PCT/IB/373 and PCT/ISA/237. (6 pages).
Notice of Allowance dated Oct. 5, 2017, issued in U.S. Appl. No. 14/912,255. (18 pages).

* cited by examiner

RUBBER COMPOSITION

TECHNICAL FIELD

The present invention relates to a rubber composition usable suitably for particularly, pneumatic tires. This rubber composition is useful as a raw material of a vulcanized rubber excellent in low exothermic performance and high in rubber hardness.

BACKGROUND ART

It has been hitherto known in the rubber industry that when a rubber composition containing a filler, such as carbon black, is produced, a rubber wet masterbatch is used to improve the workability of the composition and the dispersibility of the filler. This situation is a situation of mixing the filler and a dispersing solvent beforehand with each other at a predetermined ratio therebetween, dispersing the filler into the dispersing solvent by a mechanical force to yield a filler-containing slurry solution, mixing this slurry solution with a rubber latex solution in a liquid phase, adding a solidifier such as an acid into the mixture to solidify the mixture, and then collecting and drying the solidified mixture. In the case of using the rubber wet masterbatch, a rubber composition is obtained which is better in filler dispersibility therein and rubber properties such as workability arid reinforceability than in the case of using any dry masterbatch obtained by mixing a filler and a rubber with each other in a solid phase. The use of such a rubber composition as a raw material makes it possible to produce, for example, a pneumatic tire and other rubber products that have a decreased rolling resistance and an excellent fatigue resistance.

Apart from the above description, about a vulcanized rubber for tires, a rubber composition may be used which is obtained by mixing two or more rubber wet masterbatches with each other.

As a technique of using two or more rubber wet masterbatches as a raw material, Patent Document 1 listed below describes a technique of wet-mixing a rubber wet masterbatch (A) with a rubber wet masterbatch (B) different in composition from the rubber wet masterbatch (A), and next kneading and drying the mixture.

PRIOR ART DOCUMENT

Patent Document

Patent Document 1: JP-A-2007-197622

SUMMARY OF THE INVENTION

Problems to be Solved by the Invention

However, the inventor has made eager investigations to find out the following: in the technique described in Patent Document 1, the two rubber wet masterbatches are mixed with each other while dried; thus, the rubber composition is made homogeneous in the whole of the system; it is therefore difficult to form a specified structure therein to produce a tendency that the resultant vulcanized rubber is not improved in low exothermic performance and is not easily heightened in rubber hardness, either.

In light of this actual situation, the present invention has been made, and an object thereof is to provide a rubber composition which can be a raw material for a vulcanized rubber excellent in low exothermic performance and high in rubber hardness. The invention also relates to a pneumatic tire obtained using the rubber composition.

Means for Solving the Problems

In order to solve the problem, the present, invention has the following subject matter: the invention relates to a rubber composition obtained by dry-mixing a rubber wet masterbatch A containing a carbon black A having a nitrogen adsorption specific surface area ($N_2SA$) of NA ($m^2/g$) with a rubber wet masterbatch B containing a carbon black B having a nitrogen adsorption specific surface area ($N_2SA$) of NB ($m^2/g$), wherein the content ratio of the rubber wet masterbatch A to the rubber wet masterbatch B is from 5/95 to 40/60, and when the content proportion of the carbon black A in the rubber wet masterbatch A is represented by LA, and that of the carbon black B in the rubber wet masterbatch B is represented by LB, the following expressions (1) and (2) are satisfied:

$$NA > NB \quad (1),$$

and $$1800 \leq NA \times LA - NB \times LB \leq 7000 \quad (2)$$

wherein LA and LB each represent 100×"the content of the carbon black in the rubber wet masterbatch"/"the content of a rubber component in the rubber wet masterbatch".

This rubber composition is characterized by being produced by dry-blending, at any one of the specified ratios, the rubber wet master-batches with each other, one of which contains the carbon black large in nitrogen adsorption specific surface area and the other of which contains the carbon black small in nitrogen adsorption specific surface area. Unclear is a reason why the rubber composition obtained by dry-mixing the rubber wet masterbatches A and B, which satisfies the expressions (1) and (2), with each other can be a raw material for a vulcanized rubber excellent in low exothermic performance and high in rubber hardness. However, the reason is presumed as follows:

When the rubber wet masterbatches A and B, which satisfy the expressions (1) and (2), are dry-mixed with each other, the phase of the rubber wet masterbatch A and that of the rubber wet masterbatch B are not completely made compatible with each other to undergo an appropriate phase separation. As a result thereof, a sea-island structure is formed in which the rubber wet masterbatch A phase, which contains the carbon black large in nitrogen adsorption specific surface area, is an island phase and the rubber wet masterbatch B phase, which contains the carbon black small in nitrogen adsorption specific surface area, is a sea phase. When minute strains act onto this composition at a stage when the composition has turned a vulcanized rubber, not the island phase (rubber wet masterbatch A phase) but the sea phase (rubber wet masterbatch B phase) responds thereto so that the low exothermic performance of the vulcanized rubber is ensured. In the meantime, the island phase (rubber wet masterbatch A phase) contains the carbon black that, is a carbon black high in reinforcing performance and small in particle diameter, so that the whole of each island in the island phase behaves like a large filler particle to respond thereto. Thus, the vulcanized rubber is improved in rubber hardness.

In the rubber composition, it is preferred that the rubber component which the rubber wet masterbatch A and the rubber wet masterbatch B each contain at least one selected from the group consisting of natural rubber, polystyrene-butadiene rubber, and polybutadiene rubber. It is more preferred that when the total amount of the rubber component which the rubber wet masterbatch A contains and the rubber component which the rubber wet masterbatch B contains is regarded as 100 parts by mass, natural rubber is contained in an amount of 80 parts or more by mass. This constitution makes it possible that when the composition is turned to a vulcanized rubber, the rubber is further improved in low exothermic performance and is made higher in rubber hardness.

In the rubber composition, it is preferred that the rubber wet masterbatches A and B are each obtained through a step (α) of using at least the carbon black, a dispersing solvent and a rubber latex solution as raw materials, and dispersing at least the carbon black into the dispersing solvent to produce a carbon-black-containing slurry solution, a step (β) of mixing the carbon-black-containing slurry solution with the rubber latex solution to produce a carbon-black-containing rubber latex solution, and a step (γ) of solidifying/drying the carbon-black-containing rubber latex solution; and the step (α) is a step (α–(a)) in which when the carbon black is dispersed into the dispersing solvent, at least one portion of the rubber latex solution is added thereto, thereby producing the carbon-black-containing slurry solution in which rubber latex particles adhere to the carbon black, and the step (β) is a step (β–(a)) of mixing the carbon-black-containing slurry solution, in which the rubber latex particles adhere to the carbon black, with the rest of the rubber latex solution to produce the carbon-black-containing rubber latex solution in which rubber latex particles adhere to the carbon black. This constitution makes it possible that when the composition is turned to a vulcanized rubber, the rubber is especially improved in low exothermic performance and is made even higher in rubber hardness.

The present invention relates to a pneumatic tire including at least one of a ply topping rubber, a tread rubber and a bead filler rubber that are each obtained using the above-mentioned rubber composition. A vulcanized rubber obtained using the .rubber composition as a raw material is excellent in low exothermic performance and high in rubber hardness; thus, the pneumatic tire, which has this vulcanized rubber at its rubber region, can attain compatibility between fuel efficiency and rigidity.

MODE FOR CARRYING OUT THE INVENTION

About a rubber wet masterbatch A and a rubber wet masterbatch B each used as a raw material in the present invention, at least a carbon black, a dispersing solvent and a rubber latex solution are used as raw materials.

Examples of the carbon blacks A and B include N110 ($N_2SA$: 142 $m^2/g$), N220 ($N_2SA$: 119 $m^2/g$), N234 ($N_2SA$: 126 $m^2/g$), N326 ($N_2SA$: 84 $m^2/g$), N330 ($N_2SA$: 79 $m^2/g$), N339 ($N_2SA$: 93 $m^2/g$), N550 ($N_2SA$: 42 $m^2/g$), N660 ($N_2SA$: 27 $m^2/g$), and N774 ($N_2SA$: 27 $m^2/g$), each stipulated in ASTM D1765. From the viewpoint of an improvement in the low exothermic performance and the rubber hardness, to satisfy the expression (1) of NA>NB (1) is necessary; "NA–NB">"10 or more" is preferred, and "NA–NB">"15 or more" is more preferred. The carbon blacks may each be a granulated carbon black obtained by granulation, considering the handleability thereof in an ordinary rubber industry, or a non-granulated carbon black.

The dispersing solvent is in particular preferably water. The dispersing solvent may be water containing, for example, an organic solvent.

As the rubber latex solution, a natural rubber latex solution and a synthetic rubber latex solution are usable.

The natural rubber latex solution is a natural product produced by a metabolic effect of a plant, and is preferably a natural-rubber/water system solution in which a dispersing solvent is, particularly, water. The number-average molecular weight of natural rubber in the natural rubber latex solution used in the present invention is preferably 2000000 or more, more preferably 2500000 or more. About the natural latex solution, a concentrated latex, a fresh latex called field latex, and others are usable without being distinguished from each other. The synthetic rubber latex solution is, for example, a solution of polystyrene-butadiene rubber, polybutadiene rubber, nitrile rubber or polychloroprene rubber produced by emulsion polymerization.

The rubber component which the rubber wet masterbatches A and B each contain is preferably at least one selected from the group consisting of natural rubber, polystyrene-butadiene rubber, and polybutadiene rubber. When the total amount of the rubber components which the rubber wet masterbatches A and B contain, respectively, is regarded as 100 parts by mass, natural rubber is contained in an amount that is preferably 80 parts or more by mass, more preferably 90 parts or more by mass.

Hereinafter, a description will be made about a method for producing each of the rubber wet masterbatches used as raw materials. This producing method preferably has a step (α) of dispersing the carbon black into the dispersing solvent to produce a carbon-black-containing slurry solution, a step (β) of mixing the carbon-black-containing slurry solution with the rubber latex solution to produce a carbon-black-containing rubber latex solution, and a step (γ) of solidifying/drying the carbon-black-containing rubber latex solution.

It is particularly preferred in the present invention that the step (α) is a step (α–(a)) in which when the carbon black is dispersed into the dispersing solvent, at least one portion of the rubber latex solution is added thereto, thereby producing the carbon-black-containing slurry solution in which rubber latex particles adhere to the carbon black, and the step (β) is a step (β–(a)) of mixing the carbon-black-containing slurry solution, in which the rubber latex particles adhere to the carbon black, with the rest of the rubber latex solution to produce the carbon-black-containing rubber latex solution in which rubber latex particles adhere to the carbon black. Hereinafter, the step (α–(a)) and the step (β–(a)) will be described.

(1) Step (α–(a))

In the step (α–(a)), when the carbon black is dispersed into the dispersing solvent, at least one portion of the robber latex solution is added thereto, thereby producing a carbon-black-containing slurry solution in which rubber latex particles adhere to the carbon black. It is allowable to mix the rubber latex solution beforehand with the dispersing solvent, and subsequently add the carbon black thereto to be dispersed therein. It is also allowable to add the carbon black to the dispersing solvent, and next add the rubber latex solution thereto at a predetermined adding-speed and simultaneously disperse the carbon black in the dispersing solvent, or allowable to add the carbon black to the dispersing solvent, and next add a predetermined volume of the rubber latex solution thereto several times through operations separated from each other and simultaneously disperse the carbon black in the dispersing solvent. By dispersing the carbon black into the dispersing solvent in the presence of the rubber latex solution, a carbon-black-containing slurry solution can be produced in which rubber latex particles adhere to the carbon black. The addition amount of the rubber latex solution in the step (α–(a)) is, for example, from 0.075 to 12% by mass of the total amount of the rubber latex solution to be used (the total amount of the solution to be added in the step (α–(a)) and the step (β–(a))).

In the step (α–(a)), the solid (rubber) content in the rubber latex solution to be added is preferably from 0.25 to 15%, more preferably from 0.5 to 6% by mass of the carbon, black. The concentration of the solid (rubber) in the rubber latex solution to be added is preferably from 0.2 to 5% by mass, more preferably from 0.25 to 1.5% by mass. These cases make it possible to produce a rubber wet masterbatch in which the dispersion degree of the carbon black is heightened while the rubber latex particles are surely caused to adhere to the carbon black.

In the step (α–(a)), the method for mixing the carbon black and the dispersing solvent with each other in the presence of the rubber latex solution is, for example, a method of dispersing the carbon black, using an ordinary dispersing machine such as a highly shearing mixer, a High Shear Mixer, a homo-mixer, a ball mill, a bead mill, a high-pressure homogenizer, an ultrasonic homogenizer or a colloid mill.

The "highly shearing mixer" means a mixer having a high-speed-rotatable rotor and a fixed stator in which in the state of making a precise clearance between the rotor and the stator, the rotor is rotated to act a highly shearing effect. In order to produce such a highly shearing effect, it is preferred to set the clearance between the rotor and the stator to 0.8 mm or less, and set the circumferential speed of the rotor to 5 m/s or more. Such a highly shearing mixer may be a commercially available product, An example thereof is a mixer, "High Shear Mixer", manufactured by a company, Silverson.

At the time of mixing the carbon black with the dispersing solvent in the presence of the rubber latex solution, thereby producing the carbon-black-containing slurry solution, in which the rubber latex particles adhere to the carbon black, a surfactant may be added thereto in order to improve the carbon black in dispersibility. The surfactant may be a surfactant known in the rubber industry. Examples thereof include nonionic surfactants, anionic surfactants, cationic surfactants, and amphoteric surfactants. Instead of the surfactant or in addition of the surfactant, an alcohol such as ethanol may be used. However, when the surfactant is used, if is feared that the finally obtained vulcanized rubber is lowered in rubber physical properties. Thus, the blend amount of the surfactant is preferably 2 parts or less by mass, more preferably 1 part or less by mass for 100 parts by mass of the solid (rubber) content in the rubber latex solution. It is preferred not to use any surfactant substantially.

In the slurry solution produced in the step (α–(a)), the 90% volume particle diameter (μm) ("D90") of the carbon black to which the rubber latex particles adhere is preferably 31 μm or more, more preferably 35 μm or more. This case makes the carbon black excellent in dispersibility in the slurry solution arid makes it possible to prevent the carbon black from re-aggregating, so that the slurry solution is excellent in storage stability and further the finally obtained vulcanized rubber is also excellent in exothermic property, durability and rubber strength.

(2) Step (β–(a))

In the step (β–(a)), the slurry solution is mixed with the rest of the rubber latex solution to produce a carbon-black-containing rubber latex solution in which rubber latex particles adhere to the carbon black. The method for mixing the slurry solution with the rest, of the rubber latex solution is not particularly limited, and may be a method of mixing the slurry solution with the rest of the rubber latex solution, using an ordinary dispersing machine such as a highly shearing mixer, a High Shear Mixer, a homo-mixer, a ball mill, a bead mill, a high-pressure homogenizer, an ultrasonic homogenizer or a colloid mill. As required, the whole of the dispersing machine or some other mixing system may be heated at the time of the mixing.

When the drying period and labor in the step (γ) are considered, it is preferred that the rest of the rubber latex solution is higher in solid (rubber) concentration than the rubber latex solution added in the step (α–(a)). Specifically, the solid (rubber) concentration is preferably from 10 to 60% by mass, more preferably from 20 to 30% by mass.

(3) Step (γ)

In the step (γ), the carbon-black-containing rubber latex solution is solidified. The method for the solidification may be a method of adding a solidifier to the carbon-black-containing rubber latex solution, in which the rubber latex particles adhere to the carbon black, to yield a solidified product.

The solidifier may be a substance used ordinarily to solidify a rubber latex solution, for example, an acid such as formic acid or sulfuric acid, or a salt such as sodium chloride.

After the solidifying stage in the step (γ), the solution containing the solidified product is dried to yield each of the rubber wet masterbatches A and B. The method for drying the solution containing the solidified product maybe a method using a drying machine that may be of various types, such as an oven, a vacuum drier or an air drier.

The rubber wet masterbatches A and B obtained through/after the step (γ) each preferably contain, the carbon black in an amount of 40 to 80 parts by mass for 100 parts by mass of the rubber. This case favorably makes improvements, with a good balance, in the following, respectively: the dispersion degree of the carbon black in the rubber wet masterbatch; and the low exothermic performance and the fatigue resistance obtained when the rubber composition is made into a vulcanized rubber.

In the rubber composition according to the present invention, about the rubber wet masterbatches A and B each produced by the above-mentioned producing method, the ratio of the content of the former A to that of the latter B is set into a range preferably from 5/95 to 40/60, more preferably from 10/90 to 35/65. If the ratio of the content of the rubber wet masterbatch A to that of the rubber wet masterbatch B is less than 5, pieces of the island phase made of the rubber wet masterbatch A each become very small to make advantages small, in low exothermic performance and rubber hardness, for a vulcanized rubber made from the rubber composition made of the wet masterbatches produced by wet-mixing the slurry solution including the carbon blacks A and B with the rubber latex. In the meantime, if the ratio of the content of the rubber wet masterbatch A to that of the rubber wet masterbatch B is more than 40, the sea and island structures become reverse to each other so that the rubber wet masterbatch A turns into a sea phase. This case also makes advantages small, in low exothermic performance and rubber hardness, for a vulcanized rubber made from the rubber composition made of the wet masterbatches produced by wet-mixing the slurry solution including the carbon blacks A and B with the rubber latex.

When the content proportion of the carbon black A in the rubber wet masterbatch A is represented by LA, and that of the carbon black B in the rubber wet masterbatch B is represented by LB, the rubber composition according to the present invention has a characteristic of satisfying the following expressions (1) and (2):

$$NA > NB \quad (1),$$

and $$1800 \leq NA \times LA - NB \times LB \leq 7000 \quad (2)$$

wherein LA and LB each represent 100טthe content of the carbon black in the rubber wet masterbatch"/"the content of the rubber component in the rubber wet masterbatch".

In order to improve the low exothermic performance and the rubber hardness, NA, NB, LA, and LB satisfy the following: $1800 < NA \times LA - NB \times LB < 7000$. In the case of "$NA \times LA - NB \times LB < 1800$", a difference is small in viscosity between the rubber wet masterbatches A and B to make advantages small, in low exothermic performance and rubber hardness, for a vulcanized rubber made from the rubber composition made of the wet masterbatches produced, after the dry mixing, by wet-mixing the slurry solution including the carbon blacks A and B, in which the rubber wet masterbatches A and B are compatible with each other, with the rubber latex. Moreover, in the case of "$NA \times LA - NB \times LB > 7000$", a difference is very large in viscosity between the rubber wet masterbatches A and B so that the sea-island structure may become uneven. As a result, advantages become small, in low exothermic performance and rubber hardness, for a vulcanized rubber made from the rubber composition made of the wet masterbatches produced by wet-mixing the slurry solution including the carbon blacks A and B with the rubber latex.

The rubber composition according to the present invention can be produced by blending, into the rubber wet masterbatch obtained through/after the step (γ), one or more blending agents used usually in the rubber industry, examples of the agent(s) including a sulfur-containing vulcanizer, a vulcanization promoter, silica, a silane coupling agent, zinc oxide, stearic acid, a vulcanization promoting aid, a vulcanization retardant, an organic peroxide, an antiaging agent, softening agents such as wax and oil, and a processing aid.

The species of sulfur as the sulfur-containing vulcanizer may be any ordinary sulfur species for rubbers. Examples thereof include powdery sulfur, precipitated sulfur, insoluble sulfur, and highly dispersed sulfur. The content of the component sulfur in the rubber composition according to the present invention for tires is preferably from 0.3 to 6 parts by mass for 100 parts by mass of the rubber component. If the content of the component sulfur is less than 0.3 part by mass, the vulcanized rubber is made short in crosslinkage density to be lowered in rubber strength and others. If the content is more than 6 parts by mass, the vulcanized rubber is deteriorated in, particularly, both of heat resistance and durability. In order to ensure the rubber strength of the vulcanized rubber satisfactorily and make the heat resistance and the durability thereof better, the content of the component sulfur is more preferably from 1.5 to 5.5 parts by mass, even more preferably from 2.0 to 4.5 parts by mass for 100 parts by mass of the rubber component.

The vulcanization promoter may be a vulcanization promoter usable ordinarily for rubber-vulcanization. Examples thereof include sulfenamide type, thiuram type, thiazole type, thiourea type, guanidine type, and dithiocarbamic acid salt type vulcanization promoters. These may be used singly or in the form of an appropriate mixture. The content of the vulcanization promoter (s) is more preferably from 1.0 to 5.0 parts by mass, even more preferably from 1.5 to 4.0 parts by mass for 100 parts by mass of the rubber component.

The antiaging agent may be an antiaging agent usable usually for rubbers, examples thereof including aromatic amine type, amine-ketone type, monophenolic type, bisphenolic type, polyphenolic type, dithiocarbamic acid salt type, and thiourea type antiaging agents. These may be used singly or in the form of an appropriate mixture. The content of the antiaging agent(s) is preferably from 0.5 to 6.0 parts by mass, more preferably from 1.0 to 4.5 parts by mass for 100 parts by mass of the rubber component.

The rubber composition according to the present invention is obtained by kneading the rubber wet masterbatches together with the option(s), using a kneading machine used in an ordinary rubber industry such as a Banbury mixer, a kneader or a roll. Examples of the option(s) include a sulfur-containing vulcanizer, a vulcanization promoter, silica, a silane coupling agent, zinc oxide, stearic acid, a vulcanization promoting aid, a vulcanization retardant, an organic peroxide, an antiaging agent, softening agents such as wax and oil, and a processing aid.

The method for blending the above-mentioned individual components with each other is not particularly limited, and may be any one of a method of kneading the blending components other than the vulcanisation-related components, such as the sulfur-containing vulcanizer and the vulcanization promoter, beforehand to prepare each of the masterbatches, adding the remaining components thereto, and further kneading the resultant, a method of adding the individual components in any order and then kneading the resultant, a method of adding the whole of the components simultaneously and then kneading the resultant, and other methods.

As described above, the rubber composition according to the present invention is a composition in which the contained carbon blacks are evenly dispersed and the carbon blacks are excellent in dispersion stability over time. In particular, a pneumatic tire produced using this rubber composition comes to have a rubber region in which the carbon blacks are satisfactorily dispersed, a specific example of the tire being a pneumatic tire in which the rubber composition of the present invention is used for a tread rubber, a side rubber, a ply topping rubber, a belt coating rubber or a bead filler rubber. Accordingly, this tire has, for example, a decreased rolling resistance, and is further excellent in rigidity and low exothermic performance.

EXAMPLES

Hereinafter, this invention will be more specifically demonstrated through a description about working examples thereof. Raw materials and machines used therein are as follows:

Used Materials:

a) Fillers

Carbon black "N110": "SEAST 9" ($N_2SA$: 142 $m^2/g$) (manufactured by Tokai Carbon Co., Ltd.)

Carbon black "N234": "SEAST 7HM" ($N_2SA$: 126 $m^2/g$) (manufactured by Tokai Carbon Co., Ltd.)

Carbon black "N326": "SEAST 300" ($N_2SA$: 84 $m^2/g$) (manufactured by Tokai Carbon Co., Ltd.)

Carbon black "N550": "SEAST SO" ($N_2SA$: 42 $m^2/g$) (manufactured by Tokai Carbon Co., Ltd.)

Carbon black "N660": "SEAST V" (N$_2$SA: 27 m$^2$/g) (manufactured by Tokai Carbon Co., Ltd.)
b) Dispersing solvent: Water
c) Rubber latex solutions:
Natural rubber concentrated latex solution, manufactured by Regitex Co., Ltd. (latex solution obtained by adjusting a latex having a DRC (dry rubber content) of 60% to give a rubber concentration of 25% by mass; mass-average molecular weight Mw=236,000)
Natural rubber latex solution (NR field latex), manufactured by a company, Golden Hope (latex solution obtained by adjusting a latex having a DRC of 31.2% to give a rubber concentration of 25% by mass; mass-average molecular weight Mw=232,000)
d) Solidifier: Formic acid (solution obtained by diluting a first-class 85% solution thereof into a 10% solution to adjust the pH of the diluted solution to 1.2), manufactured by Nacalai Tesque, Inc.
e) Zinc oxide: Zinc flower No. 3, manufactured by Mitsui Mining & Smelting Co., Ltd.
f) Stearic acid, manufactured by NOK Corp.
g) Wax, manufactured by Nippon Seiro Co., Ltd.
h) Antiaging agents:
(A)
N-phenyl-N'-(1,3-dimethylbutyl)-p-phenylenediamine "6PPD" (manufactured by the company Monsanto)
(B) 2,2,4-Trimethyl-1,2-dihydroquinoline polymer "RD" (manufactured by Ouchi Shinko Chemical Industrial Co., Ltd.)
i) Sulfur, manufactured by Tsurumi Chemical Industry Co., Ltd.
j) Vulcanization promoters:
(A) N-cyclohexyl-2-benzothiazolesulfenamide "SANCELAR CM" (manufactured by Sanshin Chemical Industry Co., Ltd.)
(B) 1,3-Diphenylguanidine "NOCCELAR D" (manufactured by Ouchi Shinko Chemical Industrial Co., Ltd.)
Evaluations:
Evaluations are made about a rubber obtained by using a predetermined mold to heat and vulcanize each rubber composition at 150° C. for 30 minutes.
Low Exothermic Performance of Each Vulcanized Rubber:
According to JIS K6265, the low exothermic performance of each of the produced vulcanized rubbers is evaluated through the loss tangent tan δ thereof. A rheospectrometer, E4000, manufactured by a company, UBM, is used to measure the loss tangent at 50 Hz and 80° C. under a condition of a dynamic strain of 2%. The measured value is converted into an index. In the evaluation, the value of Comparative Example 1 is regarded as 100, and Example 1 and Comparative Examples 2 to 4 are each evaluated through an index relative thereto; the value of Comparative Example 5 is regarded as 100, and Example 2 is evaluated through an index relative thereto; the value of Comparative Example 6 is regarded as 100, and Example 3 is evaluated through an index relative thereto; the value of Comparative Example 7 is regarded as 100, and Example 4 is evaluated through an index relative thereto; the value of Comparative Example 8 is regarded as 100, and Example 5 is evaluated through an index relative thereto; the value of Comparative Example 10 is regarded as 100, and Comparative Example 9 is evaluated through an index relative thereto; the value of Comparative Example 12 is regarded as 100, and Comparative Example 11 is evaluated through an index relative thereto; the value of Comparative Example 14 is regarded as 100, and Comparative Example 13 is evaluated through an index relative thereto; the value of Comparative Example 16 is regarded as 100, and Comparative Example 15 is evaluated through an index relative thereto; the value of Comparative Example 18 is regarded as 100, and Comparative Example 17 is evaluated through an index relative thereto; the value of Comparative Example 20 is regarded as 100, and Comparative Example 19 is evaluated through an index relative thereto; the value of Comparative Example 21 is regarded as 100, and Example 6 is evaluated through an index relative thereto; the value of Comparative Example 22 is regarded as 100, and Example 7 is evaluated through an index relative thereto; the value of Comparative Example 23 is regarded as 100, and Example 8 is evaluated through an index relative thereto; the value of Comparative Example 24 is regarded as 100, and Example 9 is evaluated through an index relative thereto; and the value of Comparative Example 26 is regarded as 100, and Comparative Example 25 is evaluated through an index relative thereto. It is denoted that as the numerical value is smaller, the low exothermic performance is better.
Rubber Hardness of Each Vulcanized Rubber:
According to JIS K6253, the rubber hardness (duroraeter A type) of each of the produced vulcanized rubbers is measured at 23° C., It is denoted that as the numerical value is larger, the rubber is higher in rubber hardness to be better. In the evaluation, the value of Comparative Example 1 is regarded as 100, and Example 1 and Comparative Examples 2 to 4 are each evaluated through an index relative thereto; the value of Comparative Example 5 is regarded as 100, and Example 2 is evaluated through an index relative thereto; the value of Comparative Example 6 is regarded as 100, and Example 3 is evaluated through an index relative thereto; the value of Comparative Example 7 is regarded as 100, and Example 4 is evaluated through an index relative thereto; the value of Comparative Example 8 is regarded as 100, and Example 5 is evaluated through an index relative thereto; the value of Comparative Example 10 is regarded as 100, and Comparative Example 9 is evaluated through an index relative thereto; the value of Comparative Example 12 is regarded as 100, and Comparative Example 11 is evaluated through an index relative thereto; the value of Comparative Example 14 is regarded as 100, and Comparative Example 13 is evaluated through an index relative thereto; the value of Comparative Example 16 is regarded as 100, and Comparative Example 15 is evaluated through an index relative thereto; the value of Comparative Example 18 is regarded as 100, and Comparative Example 17 is evaluated through an index relative thereto; the value of Comparative Example 20 is regarded as 100, and Comparative Example 19 is evaluated through an index relative thereto; the value of Comparative Example 21 is regarded as 100, and Example 6 is evaluated through an index relative thereto; the value of Comparative Example 22 is regarded as 100, and Example 7 is evaluated through an index relative thereto; the value of Comparative Example 23 is regarded as 100, and Example 8 is evaluated through an index relative thereto; the value of Comparative Example 24 is regarded as 100, and Example S is evaluated through an index relative thereto; and the value of Comparative Example 26 is regarded as 100, and Comparative Example 25 is evaluated through an index relative thereto. It is denoted that as the numerical value is larger, the rubber is higher in rubber hardness to be better.

Example 1

To a diluted latex solution in water, the concentration thereof being adjusted to 0.5% by mass, were added 13.2 parts by mass of the carbon black "N110", and then a ROBOMIX manufactured by PRIMIX Corp. was used to disperse the carbon black therein (conditions of the ROBOMIX: 9000 rpm for 30 minutes). In this way, a carbon-black-containing slurry solution was produced in which natural rubber latex particles adhered to the carbon black (step (α)).

Next, the rest of the natural rubber latex solution (to which water was added to adjust the solid (rubber) concentration therein to 25% by mass) was added to the carbon-black-containing slurry solution produced in the step (α), in which the natural rubber latex particles adhered to the carbon black, to set the solid (rubber) content to 21.9 parts by mass in the total of the rest and the natural rubber latex solution used in the step (α). Next, a mixer for household use, SM-L56 type, manufactured by SANYO Electric Co., Ltd. was used to mix the individual components with each other (mixer condition: 11300 rpm for 30 minutes) to produce a carbon-black-containing natural rubber latex solution (step (β)).

Thereafter, a 10% by mass solution of formic acid in water was added as a solidifier thereto until the pH of the resultant turned to 4 (step (γ)). The solidified product was dried into a water content of 1.5% or less through a screw press, V-02 model, manufactured by Suehiro EPM Corp. to produce a natural rubber wet masterbatch (WMB-A).

Next, to a diluted latex solution in water, the concentration thereof being adjusted to 0.5% by mass, were added 62.4 parts by mass of the carbon black "N550", and then the ROBOMIX manufactured by PRIMIX Corp. was used to disperse the carbon black therein (conditions of the ROBOMIX: 9000 rpm for 30 minutes). In this way, a carbon-black-containing slurry solution was produced in which natural rubber latex particles adhered to the carbon black (step (α)).

Next, the rest of the natural rubber latex solution (to which water was added to adjust the solid (rubber) concentration therein to 25% by mass) was added to the carbon-black-containing slurry solution produced in the step (α), in which the natural rubber latex particles adhered to the carbon black, to set the solid (rubber) content, to 78.1 parts by mass in the total of the rest and the natural rubber latex solution used in the step (α). Next, the mixer SM-L56 type, for household use, manufactured by SANYO Electric Co., Ltd. was used to mix the individual components with each other (mixer condition: 11300 rpm for 30 minutes) to produce a carbon-black-containing natural rubber latex solution (step (β)). The amount of the rubber component in the natural rubber wet masterbatch A and that of the rubber component in the natural rubber wet masterbatch B were totalized into 100 parts by mass.

Thereafter, a 10% by mass solution of formic acid in water was added as a solidifier thereto until the pH of the resultant turned to 4 (step (γ)). The solidified product was dried through the screw press V-02 model manufactured by Suehiro EPM Corp. into a water content of 1.5% or less to produce a natural rubber wet masterbatch (WMB-B).

A rubber composition was then produced by dry-mixing the resultant rubber wet masterbatches A and B with each other together with various additives described in Table 1. The physical properties of a vulcanized rubber therefrom were measured. The results are shown in Table 1.

Comparative Example 1

A natural rubber wet masterbatch (MB-1) was produced in the same way as used to produce the natural rubber wet masterbatch except that in the step (α) in the method for producing the natural rubber wet masterbatch A, both of 13.2 parts by mass of the carbon black A "N110" and 62.4 parts by mass of the carbon black B "N550" were added. Various additives were blended into this masterbatch to produce a rubber composition. The physical properties of a vulcanized rubber therefrom were measured. The results are shown in Table 1.

Examples 2 to 9, and Comparative Examples 2 to 26

In each of the examples, a vulcanized rubber was produced in the same way as in Example 1 except that the respective blend formulations of the rubber wet masterbatches A and B, and the blend formulation of the natural rubber wet masterbatch were each changed into a formulation in any one of Tables 1 to 3. The results are shown in the table of Tables 1 to 3.

TABLE 1

| | | Example 1 | Comparative Example 1 | Comparative Example 2 | Comparative Example 3 | Comparative Example 4 | Example 2 | Comparative Example 5 |
|---|---|---|---|---|---|---|---|---|
| Blending components for WMB-A | Polymer species | NR | — | NR | NR | — | NR | — |
| | Content | 21.9 | — | 100.0 | 21.9 | — | 11.1 | — |
| | Carbon black species | N110 | — | N110 | N110 | — | N110 | — |
| | Content | 13.2 | — | 13.2 | 13.2 | — | 6.7 | — |
| | NA (m$^2$/g) | 142 | — | 142 | 142 | — | 142 | — |
| | LA | 60 | — | 13 | 60 | — | 60 | — |
| Blending components for WMB-B | Polymer species | NR | — | — | — | — | NR | — |
| | Content | 78.1 | — | — | — | — | 88.9 | — |
| | Carbon black species | N550 | — | — | — | — | N550 | — |
| | Content | 62.4 | — | — | — | — | 71.1 | — |
| | NB (m$^2$/g) | 42 | — | — | — | — | 42 | — |
| | LB | 80 | — | — | — | — | 80 | — |
| Content proportions | WMB-A | 20 | — | — | — | — | 10 | — |
| | WMB-B | 80 | — | — | — | — | 90 | — |
| | NA × LA − NB × LB | 5160 | — | — | — | — | 5160 | — |
| Rubber composition blend formulation | WMB-A | 35.1 | — | 113.2 | 35.1 | — | 17.8 | — |
| | WMB-B | 140.5 | — | — | — | — | 160.0 | — |
| | MB-1 (NR (100 parts by mass), N110 (13.2 parts by mass) and N550 (62.4 parts by mass) | — | 175.6 | — | — | — | — | — |

TABLE 1-continued

|  |  | | | | | | | |
|---|---|---|---|---|---|---|---|---|
|  | MB-2 (NR (100 parts by mass), N110 (6.7 parts by mass) and N550 (71.1 parts by mass) | — | — | — | — | — | — | 178.8 |
|  | MB-3 (NR (100 parts by mass), N110 (10.1 parts by mass) and N550 (67.3 parts by mass) | — | — | — | — | — | — | — |
|  | MB-4 (NR (100 parts by mass), N110 (22.6 parts by mass) and N550 (49.9 parts by mass) | — | — | — | — | — | — | — |
|  | MB-5 (NR (100 parts by mass), N110 (14.3 parts by mass) and N550 (59.7 parts by mass) | — | — | — | — | — | — | — |
|  | NR | — | — | — | 78.1 | 100 | — | — |
|  | Carbon black species | — | — | — | — | N110 | — | — |
|  | Content | — | — | — | — | 13.2 | — | — |
|  | Carbon black species | — | — | N550 | N550 | N550 | — | — |
|  | Content | — | — | 62.4 | 62.4 | 62.4 | — | — |
|  | Zinc flower | 3 | 3 | 3 | 3 | 3 | 3 | 3 |
|  | Stearic acid | 2 | 2 | 2 | 2 | 2 | 2 | 2 |
|  | Wax | 2 | 2 | 2 | 2 | 2 | 2 | 2 |
|  | Antiaging agent (A) | 2 | 2 | 2 | 2 | 2 | 2 | 2 |
|  | Antiaging agent (B) | 1 | 1 | 1 | 1 | 1 | 1 | 1 |
|  | Sulfur | 2 | 2 | 2 | 2 | 2 | 2 | 2 |
|  | Vulcanization promoter (A) | 1.5 | 1.5 | 1.5 | 1.5 | 1.5 | 1.5 | 1.5 |
|  | Vulcanization promoter (B) | 0.5 | 0.5 | 0.5 | 0.5 | 0.5 | 0.5 | 0.5 |
| Vulcanized rubber physical properties | Low exothermic performance (tanδ) | 85 | 100 | 110 | 115 | 120 | 80 | 100 |
|  | Rubber hardness | 110 | 100 | 105 | 110 | 105 | 108 | 100 |

|  |  | Example 3 | Comparative Example 6 | Example 4 | Comparative Example 7 | Example 5 | Comparative Example 8 |
|---|---|---|---|---|---|---|---|
| Blending components for WMB-A | Polymer species | NR | — | NR | — | NR | — |
|  | Content | 25.4 | — | 37.7 | — | 20.4 | — |
|  | Carbon black species | N110 | — | N110 | — | N110 | — |
|  | Content | 10.1 | — | 22.6 | — | 14.3 | — |
|  | NA (m²/g) | 142 | — | 142 | — | 142 | — |
|  | LA | 40 | — | 60 | — | 70 | — |
| Blending components for WMB-B | Polymer species | NR | — | NR | — | NR | — |
|  | Content | 74.6 | — | 62.3 | — | 79.6 | — |
|  | Carbon black species | N550 | — | N550 | — | N550 | — |
|  | Content | 67.3 | — | 49.9 | — | 59.7 | — |
|  | NB (m²/g) | 42 | — | 42 | — | 42 | — |
|  | LB | 90 | — | 80 | — | 75 | — |
| Content proportions | WMB-A | 20 | — | 35 | — | 20 | — |
|  | WMB-B | 80 | — | 65 | — | 80 | — |
|  | NA × LA − NB × LB | 1900 | — | 5160 | — | 6790 | — |
| Rubber composition blend formulation | WMB-A | 35.5 | — | 60.3 | — | 34.7 | — |
|  | WMB-B | 141.9 | — | 112.2 | — | 139.3 | — |
|  | MB-1 (NR (100 parts by mass), N110 (13.2 parts by mass) and N550 (62.4 parts by mass) | — | — | — | — | — | — |
|  | MB-2 (NR (100 parts by mass), N110 (6.7 parts by mass) and N550 (71.1 parts by mass) | — | — | — | — | — | — |
|  | MB-3 (NR (100 parts by mass), N110 (10.1 parts by mass) and N550 (67.3 parts by mass) | — | 177.4 | — | — | — | — |
|  | MB-4 (NR (100 parts by mass), N110 (22.6 parts by mass) and N550 (49.9 parts by mass) | — | — | — | 172.5 | — | — |
|  | MB-5 (NR (100 parts by mass), N110 (14.3 parts by mass) and N550 (59.7 parts by mass) | — | — | — | — | — | 174.0 |
|  | NR | — | — | — | — | — | — |
|  | Carbon black species | — | — | — | — | — | — |
|  | Content | — | — | — | — | — | — |
|  | Carbon black species | — | — | — | — | — | — |

TABLE 1-continued

|  |  |  |  |  |  |  |  |
|---|---|---|---|---|---|---|---|
|  | Content | — | — | — | — | — | — |
|  | Zinc flower | 3 | 3 | 3 | 3 | 3 | 3 |
|  | Stearic acid | 2 | 2 | 2 | 2 | 2 | 2 |
|  | Wax | 2 | 2 | 2 | 2 | 2 | 2 |
|  | Antiaging agent (A) | 2 | 2 | 2 | 2 | 2 | 2 |
|  | Antiaging agent (B) | 1 | 1 | 1 | 1 | 1 | 1 |
|  | Sulfur | 2 | 2 | 2 | 2 | 2 | 2 |
|  | Vulcanization promoter (A) | 1.5 | 1.5 | 1.5 | 1.5 | 1.5 | 1.5 |
|  | Vulcanization promoter (B) | 0.5 | 0.5 | 0.5 | 0.5 | 0.5 | 0.5 |
| Vulcanized rubber physical properties | Low exothermic performance (tanδ) | 78 | 100 | 79 | 100 | 83 | 100 |
|  | Rubber hardness | 112 | 100 | 111 | 100 | 108 | 100 |

TABLE 2

|  |  | Comparative Example 9 | Comparative Example 10 | Comparative Example 11 | Comparative Example 12 | Comparative Example 13 | Comparative Example 14 |
|---|---|---|---|---|---|---|---|
| Blending components for WMB-A | Polymer species | NR | — | NR | — | NR | — |
|  | Content | 58.8 | — | 27.7 | — | 20.0 | — |
|  | Carbon black species | N110 | — | N110 | — | N110 | — |
|  | Content | 23.5 | — | 8.3 | — | 18.0 | — |
|  | NA (m²/g) | 142 | — | 142 | — | 142 | — |
|  | LA | 40 | — | 30 | — | 90 | — |
| Blending components for WMB-B | Polymer species | NR | — | NR | — | NR | — |
|  | Content | 41.2 | — | 72.3 | — | 80.0 | — |
|  | Carbon black species | N550 | — | N550 | — | N550 | — |
|  | Content | 41.3 | — | 72.2 | — | 72.0 | — |
|  | NB (m²/g) | 42 | — | 42 | — | 42 | — |
|  | LB | 100 | — | 100 | — | 90 | — |
| Content proportions | WMB-A | 50 | — | 20 | — | 20 | — |
|  | WMB-B | 50 | — | 80 | — | 80 | — |
|  | NA × LA − NB × LB | 1480 | — | 60 | — | 9000 | — |
| Rubber composition blend formulation | WMB-A | 82.3 | — | 36.0 | — | 38.0 | — |
|  | WMB-B | 82.5 | — | 144.5 | — | 152.0 | — |
|  | MB-6 (NR (100 parts by mass), N110 (23.5 parts by mass) and N550 (41.3 parts by mass) | — | 164.8 | — | — | — | — |
|  | MB-7 (NR (100 parts by mass), N110 (8.3 parts by mass) and N550 (72.2 parts by mass) | — | — | — | 180.5 | — | — |
|  | MB-8 (NR (100 parts by mass), N110 (18.0 parts by mass) and N550 (72.0 parts by mass) | — | — | — | — | — | 190.0 |
|  | MB-9 (NR (100 parts by mass), N110 (10.3 parts by mass) and N550 (70.2 parts by mass) | — | — | — | — | — | — |
|  | MB-10 (NR (100 parts by mass), N110 (2.0 parts by mass) and N550 (77.3 parts by mass) | — | — | — | — | — | — |
|  | MB-11 (NR (100 parts by mass), N110 (0.7 parts by mass) and N550 (79.1 parts by mass) | — | — | — | — | — | — |
|  | Carbon black species | — | — | — | — | — | — |
|  | Content | — | — | — | — | — | — |
|  | Carbon black species | — | — | — | — | — | — |
|  | Content | — | — | — | — | — | — |
|  | Zinc flower | 3 | 3 | 3 | 3 | 3 | 3 |
|  | Stearic acid | 2 | 2 | 2 | 2 | 2 | 2 |
|  | Wax | 2 | 2 | 2 | 2 | 2 | 2 |
|  | Antiaging agent (A) | 2 | 2 | 2 | 2 | 2 | 2 |
|  | Antiaging agent (B) | 1 | 1 | 1 | 1 | 1 | 1 |
|  | Sulfur | 2 | 2 | 2 | 2 | 2 | 2 |
|  | Vulcanization promotor (A) | 1.5 | 1.5 | 1.5 | 1.5 | 1.5 | 1.5 |
|  | Vulcanization promoter (B) | 0.5 | 0.5 | 0.5 | 0.5 | 0.5 | 0.5 |

TABLE 2-continued

| | | | | | | | |
|---|---|---|---|---|---|---|---|
| Vulcanized rubber physical properties | Low exothermic performance (tanδ) | 107 | 100 | 110 | 100 | 110 | 100 |
| | Rubber hardness | 95 | 100 | 90 | 100 | 90 | 100 |

| | | Comparative Example 15 | Comparative Example 16 | Comparative Example 17 | Comparative Example 18 | Comparative Example 19 | Comparative Example 20 |
|---|---|---|---|---|---|---|---|
| Blending components for WMB-A | Polymer species | NR | — | NR | — | NR | — |
| | Content | 25.8 | — | 3.3 | — | 1.2 | — |
| | Carbon black species | N110 | — | N110 | — | N110 | — |
| | Content | 10.3 | — | 2.0 | — | 0.7 | — |
| | NA (m²/g) | 142 | — | 142 | — | 142 | — |
| | LA | 40 | — | 60 | — | 60 | — |
| Blending components for WMB-B | Polymer species | NR | — | NR | — | NR | — |
| | Content | 74.2 | — | 96.7 | — | 98.8 | — |
| | Carbon black species | N550 | — | N550 | — | N550 | — |
| | Content | 70.2 | — | 77.3 | — | 79.1 | — |
| | NB (m²/g) | 42 | — | 42 | — | 42 | — |
| | LB | 95 | — | 80 | — | 80 | — |
| Content proportions | WMB-A | 20 | — | 3 | — | 1 | — |
| | WMB-B | 80 | — | 97 | — | 99 | — |
| | NA × LA − NB × LB | 1690 | — | 5160 | — | 4420 | — |
| Rubber composition blend formulation | WMB-A | 36.1 | — | 5.3 | — | 1.9 | — |
| | WMB-B | 144.4 | — | 174.0 | — | 177.9 | — |
| | MB-6 (NR (100 parts by mass), N110 (23.5 parts by mass) and N550 (41.3 parts by mass) | — | — | — | — | — | — |
| | MB-7 (NR (100 parts by mass), N110 (8.3 parts by mass) and N550 (72.2 parts by mass) | — | — | — | — | — | — |
| | MB-8 (NR (100 parts by mass), N110 (18.0 parts by mass) and N550 (72.0 parts by mass) | — | — | — | — | — | — |
| | MB-9 (NR (100 parts by mass), N110 (10.3 parts by mass) and N550 (70.2 parts by mass) | — | 180.5 | — | — | — | — |
| | MB-10 (NR (100 parts by mass), N110 (2.0 parts by mass) and N550 (77.3 parts by mass) | — | — | — | 179.3 | — | — |
| | MB-11 (NR (100 parts by mass), N110 (0.7 parts by mass) and N550 (79.1 parts by mass) | — | — | — | — | — | 179.8 |
| | Carbon black species | — | — | — | — | — | — |
| | Content | — | — | — | — | — | — |
| | Carbon black species | — | — | — | — | — | — |
| | Content | — | — | — | — | — | — |
| | Zinc flower | 3 | 3 | 3 | 3 | 3 | 3 |
| | | 2 | 2 | 2 | 2 | 2 | 2 |
| | Stearic acid | 2 | 2 | 2 | 2 | 2 | 2 |
| | Wax | 2 | 2 | 2 | 2 | 2 | 2 |
| | Antiaging agent (A) | 2 | 2 | 2 | 2 | 2 | 2 |
| | Antiaging agent (B) | 1 | 1 | 1 | 1 | 1 | 1 |
| | Sulfur | 2 | 2 | 2 | 2 | 2 | 2 |
| | Vulcanization promotor (A) | 1.5 | 1.5 | 1.5 | 1.5 | 1.5 | 1.5 |
| | Vulcanization promoter (B) | 0.5 | 0.5 | 0.5 | 0.5 | 0.5 | 0.5 |
| Vulcanized rubber physical properties | Low exothermic performance (tanδ) | 113 | 100 | 100 | 100 | 100 | 100 |
| | Rubber hardness | 93 | 100 | 99 | 100 | 99 | 100 |

TABLE 3

|  |  | Example 6 | Comparative Example 21 | Example 7 | Comparative Example 22 | Example 8 | Comparative Example 23 |
|---|---|---|---|---|---|---|---|
| Blending components for WMB-A | Polymer species | NR | — | NR | — | NR | — |
|  | Content | 18.0 | — | 18.0 | — | 18.0 | — |
|  | Carbon black species | N110 | — | N234 | — | N326 | — |
|  | Content | 10.8 | — | 10.8 | — | 10.8 | — |
|  | NA (m²/g) | 142 | — | 126 | — | 84 | — |
|  | LA | 60 | — | 60 | — | 60 | — |
| Blending components for WMB-B | Polymer species | NR | — | NR | — | NR | — |
|  | Content | 82.0 | — | 82.0 | — | 82.0 | — |
|  | Carbon black species | N234 | — | N326 | — | N550 | — |
|  | Content | 32.8 | — | 32.8 | — | 32.8 | — |
|  | NB (m²/g) | 126 | — | 84 | — | 42 | — |
|  | LB | 40 | — | 40 | — | 40 | — |
| Content proportions | WMB-A | 20 | — | 20 | — | 20 | — |
|  | WMB-B | 80 | — | 80 | — | 80 | — |
|  | NA × LA − NB × LB | 3480 | — | 4200 | — | 3360 | — |
| Rubber composition blend formulation | WMB-A | 28.8 | — | 28.7 | — | 28.7 | — |
|  | WMB-B | 114.8 | — | 114.9 | — | 114.9 | — |
|  | MB-12 (NR (100 parts by mass), N110 (10.8 parts by mass) and N234 (32.8 parts by mass) | — | 143.6 | — | — | — | — |
|  | MB-13 (NR (100 parts by mass), N234 (10.8 parts by mass) and N326 (32.8 parts by mass) | — | — | — | 143.6 | — | — |
|  | MB-14 (NR (100 parts by mass), N326 (10.8 parts by mass) and N550 (32.8 parts by mass) | — | — | — | — | — | 143.6 |
|  | MB-15 (NR (100 parts by mass), N110 (12.0 parts by mass) and N550 (68.4 parts by mass) | — | — | — | — | — | — |
|  | MB-16 (NR (100 parts by mass), N234 (25.0 parts by mass) and N550 (25.0 parts by mass) | — | — | — | — | — | — |
|  | Carbon black species | — | — | — | — | — | — |
|  | Content | — | — | — | — | — | — |
|  | Carbon black species | — | — | — | — | — | — |
|  | Content | — | — | — | — | — | — |
|  | Zinc flower | 3 | 3 | 3 | 3 | 3 | 3 |
|  |  | 2 | 2 | 2 | 2 | 2 | 2 |
|  | Stearic acid | 2 | 2 | 2 | 2 | 2 | 2 |
|  | Wax | 2 | 2 | 2 | 2 | 2 | 2 |
|  | Antiaging agent (A) | 2 | 2 | 2 | 2 | 2 | 2 |
|  | Antiaging agent (B) | 1 | 1 | 1 | 1 | 1 | 1 |
|  | Sulfur | 2 | 2 | 2 | 2 | 2 | 2 |
|  | Vulcanization promotor (A) | 1.5 | 1.5 | 1.5 | 1.5 | 1.5 | 1.5 |
|  | Vulcanization promoter (B) | 0.5 | 0.5 | 0.5 | 0.5 | 0.5 | 0.5 |
| Vulcanized rubber physical properties | Low exothermic performance (tanδ) | 87 | 100 | 83 | 100 | 86 | 113 |
|  | Rubber hardness | 113 | 100 | 111 | 100 | 115 | 93 |

|  |  | Example 9 | Comparative Example 24 | Comparative Example 25 | Comparative Example 26 |
|---|---|---|---|---|---|
| Blending components for WMB-A | Polymer species | NR | — | NR | — |
|  | Content | 24.0 | — | 50.0 | — |
|  | Carbon black species | N110 | — | N234 | — |
|  | Content | 12.0 | — | 25.0 | — |
|  | NA (m²/g) | 142 | — | 126 | — |
|  | LA | 50 | — | 50 | — |
| Blending components for WMB-B | Polymer species | NR | — | NR | — |
|  | Content | 76.0 | — | 50.0 | — |
|  | Carbon black species | N660 | — | N550 | — |
|  | Content | 68.4 | — | 25.0 | — |
|  | NB (m²/g) | 27 | — | 42 | — |
|  | LB | 90 | — | 50 | — |

TABLE 3-continued

| | | | | | |
|---|---|---|---|---|---|
| Content proportions | WMB-A | 20 | — | 50 | — |
| | WMB-B | 80 | — | 50 | — |
| | NA × LA − NB × LB | 4670 | — | 4200 | — |
| Rubber composition blend formulation | WMB-A | 36.0 | — | 75.0 | — |
| | WMB-B | 144.4 | — | 75.0 | — |
| | MB-12 (NR (100 parts by mass), N110 (10.8 parts by mass) and N234 (32.8 parts by mass) | — | — | — | — |
| | MB-13 (NR (100 parts by mass), N234 (10.8 parts by mass) and N326 (32.8 parts by mass) | — | — | — | — |
| | MB-14 (NR (100 parts by mass), N326 (10.8 parts by mass) and N550 (32.8 parts by mass) | — | — | — | — |
| | MB-15 (NR (100 parts by mass), N110 (12.0 parts by mass) and N550 (68.4 parts by mass) | — | 180.4 | — | — |
| | MB-16 (NR (100 parts by mass), N234 (25.0 parts by mass) and N550 (25.0 parts by mass) | — | — | — | 150.0 |
| | Carbon black species | — | — | — | — |
| | Content | — | — | — | — |
| | Carbon black species | — | — | — | — |
| | Content | — | — | — | — |
| | Zinc flower | 3 | 3 | 3 | 3 |
| | | 2 | 2 | 2 | 2 |
| | Stearic acid | 2 | 2 | 2 | 2 |
| | Wax | 2 | 2 | 2 | 2 |
| | Antiaging agent (A) | 2 | 2 | 2 | 2 |
| | Antiaging agent (B) | 1 | 1 | 1 | 1 |
| | Sulfur | 2 | 2 | 2 | 2 |
| | Vulcanization promotor (A) | 1.5 | 1.5 | 1.5 | 1.5 |
| | Vulcanization promoter (B) | 0.5 | 0.5 | 0.5 | 0.5 |
| Vulcanized rubber physical properties | Low exothermic performance (tanδ) | 84 | 100 | 100 | 100 |
| | Rubber hardness | 110 | 100 | 98 | 100 |

The invention claimed is:

1. A rubber composition obtained by dry-mixing a rubber wet masterbatch A containing a carbon black A having a nitrogen adsorption specific surface area (N₂SA) of NA (m²/g) with a rubber wet masterbatch B containing a carbon black B having a nitrogen adsorption specific surface area (N₂SA) of NB (m²/g),
wherein the rubber wet masterbatch A and the rubber wet masterbatch B each contains natural rubber;
wherein the content ratio of the rubber wet masterbatch A to the rubber wet masterbatch B is from 5/95 to 40/60, and
when the content proportion of the carbon black A in the rubber wet masterbatch A is represented by LA, and that of the carbon black B in the rubber wet masterbatch B is represented by LB, the following expressions (1) and (2) are satisfied:

$$NA > NB \quad (1),$$

and $$1800 \le NA \times LA - NB \times LB \le 7000 \quad (2)$$

wherein LA and LB each represent 100בthe content of the carbon black in the rubber wet masterbatch"/"the content of a rubber component in the rubber wet masterbatch".

2. The rubber composition according to claim 1, wherein when the total amount of the rubber component which the rubber wet masterbatch A contains and the rubber component which the rubber wet masterbatch B contains is regarded as 100 parts by mass, natural rubber or the component natural rubber is contained in an amount of 80 parts or more by mass.

3. The rubber composition according to claim 1, wherein the rubber wet masterbatch A and the rubber wet masterbatch B are each obtained through a step (α) of using at least the carbon black, a dispersing solvent and a rubber latex solution as raw materials, and dispersing at least the carbon black into the dispersing solvent to produce a carbon-black-containing slurry solution, a step (β) of mixing the carbon-black-containing slurry solution with the rubber latex solution to produce a carbon-black-containing rubber latex solution, and a step (γ) of solidifying/drying the carbon-black-containing rubber latex solution; and
the step (α) is a step (α-(a)) in which when the carbon black is dispersed into the dispersing solvent, at least one portion of the rubber latex solution is added thereto, thereby producing the carbon-black-containing slurry solution in which rubber latex particles adhere to the carbon black, and
the step (β) is a step (β-(a)) of mixing the carbon-black-containing slurry solution, in which the rubber latex particles adhere to the carbon black, with the rest of the rubber latex solution to produce the carbon-black-containing rubber latex solution in which rubber latex particles adhere to the carbon black.

4. A pneumatic tire, comprising a ply topping rubber obtained using the rubber composition recited claim 1.

5. A pneumatic tire, comprising a tread rubber obtained using the rubber composition recited in claim 1.

6. A pneumatic tire, comprising a bead filler rubber obtained using the rubber composition recited claim 1.

* * * * *